United States Patent
Werner et al.

(10) Patent No.: US 9,886,377 B2
(45) Date of Patent: Feb. 6, 2018

(54) PIPELINED CONVOLUTIONAL OPERATIONS FOR PROCESSING CLUSTERS

(71) Applicant: Intel Corporation, Santa Clara, CA (US)

(72) Inventors: Tony Werner, Los Altos, CA (US);
Aravind Kalaiah, San Jose, CA (US);
Andrew Yang, Cupertino, CA (US);
Carey Kloss, Los Altos, CA (US);
Horace Lau, Mountain View, CA (US);
Naveen Gandham Rao, San Diego, CA (US); Amir Khosrowshahi, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 122 days.

(21) Appl. No.: 14/874,784

(22) Filed: Oct. 5, 2015

(65) Prior Publication Data
US 2017/0097884 A1 Apr. 6, 2017

(51) Int. Cl.
*G06F 12/00* (2006.01)
*G06F 12/02* (2006.01)
*G06F 15/76* (2006.01)
*G06T 1/20* (2006.01)

(52) U.S. Cl.
CPC .......... *G06F 12/023* (2013.01); *G06F 15/76* (2013.01); *G06T 1/20* (2013.01); *G06F 2212/251* (2013.01)

(58) Field of Classification Search
None
See application file for complete search history.

(56) References Cited

U.S. PATENT DOCUMENTS

| | | | | |
|---|---|---|---|---|
| 5,958,043 A * | 9/1999 | Motomura | ............ | G06F 9/3838 712/216 |
| 6,615,340 B1 * | 9/2003 | Wilmot, II | ............ | G06F 9/3004 712/209 |
| 6,745,384 B1 * | 6/2004 | Biggerstaff | ........... | G06F 8/4441 712/203 |
| 2006/0101245 A1 * | 5/2006 | Nair | .................... | G06F 9/30014 712/221 |
| 2006/0161612 A1 * | 7/2006 | Gustayson | .............. | G06F 17/16 708/495 |
| 2010/0088739 A1 * | 4/2010 | Hall | .................... | G06F 12/1483 726/1 |

(Continued)

*Primary Examiner* — John A Lane
(74) *Attorney, Agent, or Firm* — Alliance IP, LLC

(57) ABSTRACT

Described herein are one or more integrated circuits (ICs) comprising controller circuitry to receive a command to execute an operation for data inputs stored in an external memory or a local memory, and convert the operation into a set of matrix operations to operate on sub-portions of the data inputs. The IC(s) further comprise at least one processing circuitry to execute the set of matrix operations, the processing circuitry to include ALUs, a local memory external to the ALUs and accessible by the ALUs, and processing control circuitry to create at least one matrix operand in the local memory (from the data inputs of the operation) comprising at least one of a scalar, a vector, or a 2D matrix, and provide memory handles corresponding to each of the matrix operands to one of the ALUs to access the respective matrix operands when executing a matrix operation.

20 Claims, 15 Drawing Sheets

(56) References Cited

U.S. PATENT DOCUMENTS

2013/0073920 A1* 3/2013 Nie ...................... H03M 13/27
                                                        714/752
2014/0372825 A1* 12/2014 Jeong ................ H03M 13/1165
                                                        714/752
2015/0301887 A1* 10/2015 Zhang ................ H03M 13/1102
                                                        714/764
2015/0378734 A1* 12/2015 Hansen ............... G06F 12/0875
                                                        712/226

* cited by examiner

PIPELINED CONVOLUTIONAL OPERATIONS FOR PROCESSING CLUSTERS

FIELD

Embodiments generally pertain to computer processing operations and more particularly to increasing memory access efficiency in processing clusters.

BACKGROUND

Systems executing computationally intensive operations, such as linear algebra operations involving large, multi-dimensional operands, typically utilize large amounts of memory storage. Memory access operations and latency can affect system performance; thus, methods for reducing the use of memory storage during the execution of operations can increase processing speed and performance.

BRIEF DESCRIPTION OF THE DRAWINGS

The following description includes discussions of figures having illustrations given by way of example of implementations and embodiments of the subject matter disclosed herein. The drawings should be understood by way of example, and not by way of limitation. As used herein, references to one or more "embodiments" are to be understood as describing a particular feature, structure, or characteristic included in at least one implementation of the disclosure. Thus, phrases such as "in one embodiment" or "in an alternate embodiment" appearing herein describe various embodiments and implementations of the disclosure, and do not necessarily all refer to the same embodiment. However, such phrases are also not necessarily mutually exclusive.

Descriptions of certain details and implementations follow, including a description of the figures, which can depict some or all of the embodiments described below, as well as a description of other potential embodiments or implementations of the concepts presented herein. An overview of embodiments is provided below, followed by a more detailed description with reference to the drawings.

DESCRIPTION

Embodiments of the disclosure describe methods, apparatuses, and systems for pipelined convolutional operations in processing clusters. Throughout this specification, several terms of art are used. These terms are to take on their ordinary meaning in the art from which they come, unless specifically defined herein or unless the context of their use would clearly suggest otherwise. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects of the disclosure.

Figure 1A:
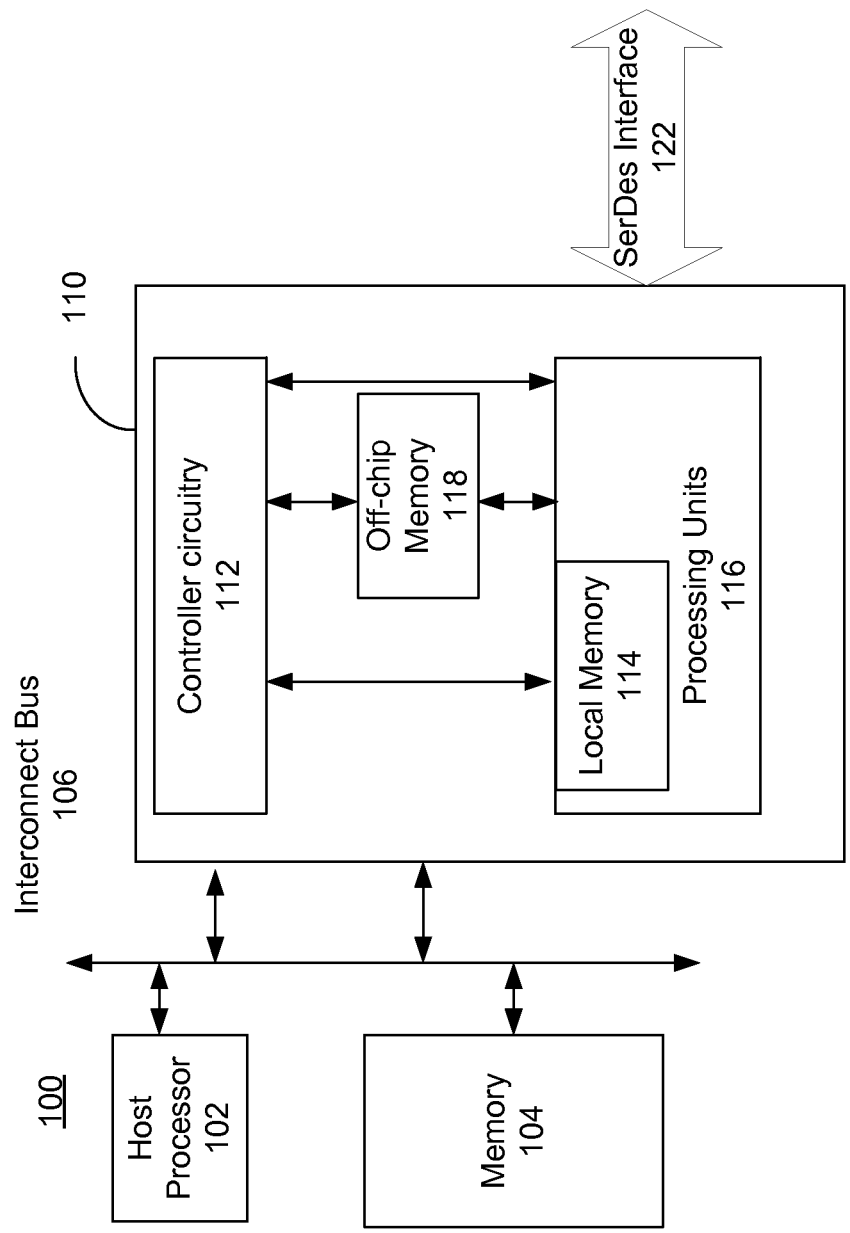
FIG. 1A-FIG. 1B are block diagrams of system components for executing linear algebra operations involving large, multi-dimensional operands in accordance with some embodiments.
Figure 1B:
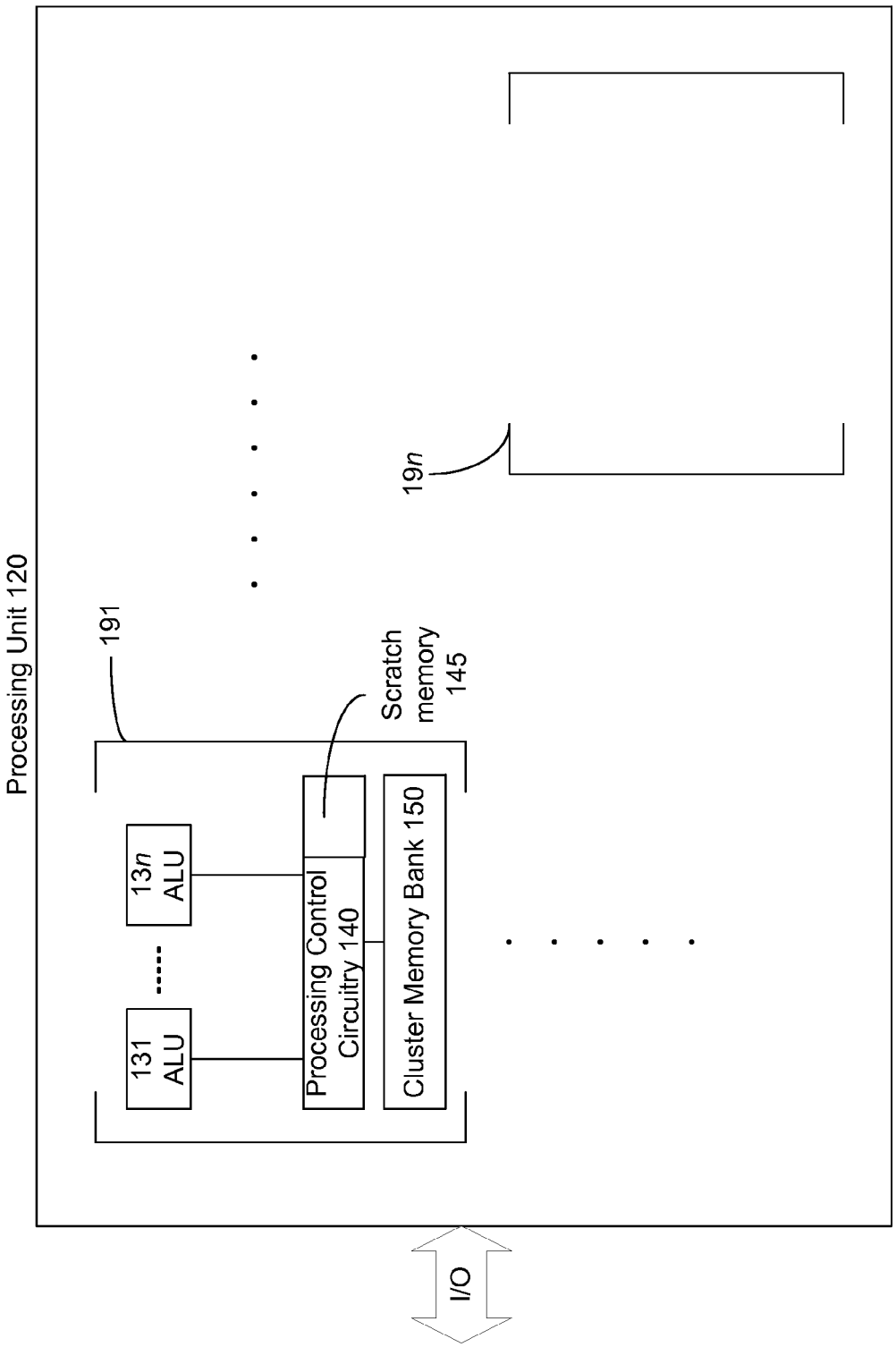

FIG. 1A-FIG. 1B are block diagrams of system components for executing linear algebra operations involving large, multi-dimensional operands in accordance with some embodiments. In the embodiment illustrated in FIG. 1A, a system 100 is shown to include a peripheral apparatus 110 including a peripheral apparatus controller circuitry 112, a local memory 114 (alternatively referred to herein as "on-chip" memory), off-chip memory 118 (comprising any combination of non-volatile and volatile memory), and one or more processing units 116. The peripheral apparatus 110 is shown to be communicatively coupled to host system components including a host processor 102 and a memory 104. The memory 104 can comprise any combination of non-volatile and volatile memory, such as cache memory of the host processor 102, or on-board memory, such as double data rate (DDR) memory, random access memory (RAM) such as synchronous RAM (SRAM), dynamic RAM (DRAM), etc. The peripheral apparatus 110 is further shown to include one or more serializer/deserializer (SerDes) interfaces 122 for potentially coupling to one or more additional similarly configured peripheral apparatuses.

The peripheral apparatus 110 can be communicatively coupled to various host components including the host processor 102 and the memory 104 via an interconnect bus 106, and can communicate via any known interconnection protocol (e.g., a Peripheral Component Interconnect express (PCIe) protocol, a Small Computer Systems Interface (SCSI) protocol, a Fibre Channel (FC) protocol, a Serial Attached SCSI (SAS) protocol, a Universal Serial Bus (USB) protocol, etc.). In other embodiments, the components of the peripheral apparatus 110 can comprise components integrated with the host device or the functionality of the components of the peripheral apparatus 110 can be executed via components of the host device, such that the utilization of the interconnect bus 106 is not necessary.

The processing units 116 can comprise a plurality of processing clusters, where each cluster includes one or more arithmetic logic units (ALUs), associated control circuitry, and local memory for the cluster. FIG. 1B is an illustration of a processing unit 120 in accordance with some embodiments. The processing unit 120 is one of the processing units 116 of FIG. 1A and is shown to include a plurality of processing clusters 191-19n. The processing cluster 191 includes a plurality of arithmetic logic units (ALUs) 131-13n, cluster specific memory 150, and processing control circuitry 140 (which can include its own local or "scratch" memory 145). The remaining clusters can include similar components. The clusters 191-19n can be communicatively interconnected (i.e., networked) to exchange signals and data. These signals can include busy, idle, data transfer request, data routing, etc. Data can include any data generated by the ALUs or data stored in the cluster local memory.

Referring back to FIG. 1A, the controller circuitry 112 of the peripheral apparatus 110 can receive a command to execute operations related to an application of executed by the host system; these operations are executed via the processing units 116. Software executed by any combination of the host system and the controller circuitry 112 of the peripheral apparatus 110 can determine how operations related to the application can be distributed amongst the processing units 116.

The application executed by the host system can comprise a deep learning application, and the operations related to the application can comprise convolution operations, linear contrast operations, local response normalization operations, max pooling operations, averaging operations, etc. The application and its operations can utilize data inputs that are stored in the memory 104. In some embodiments, the controller circuitry 112 can load some or all of the data inputs into the memories 114 and 118 of the peripheral apparatus, depending on the size of the data inputs; processing control circuitry of the various processing clusters (e.g., processing control circuitry 140 of processing cluster 191) can access any of these memories to perform the operations described below.

Figure 2:
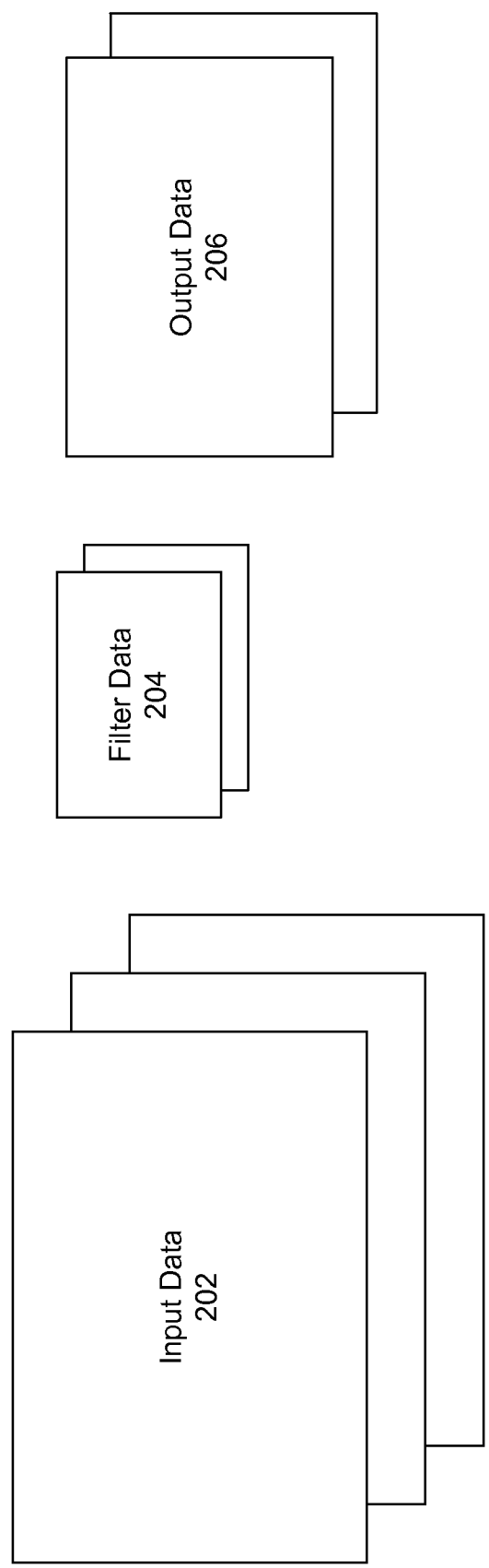
FIG. 2 is an illustration of data used for convolution operations in accordance with some embodiments.

FIG. 2 is an illustration of data used for convolution operations in accordance with some embodiments. Convolution operations involve applying a function repeatedly across input data. Convolution operations can be used by neural networks for identifying aspects or objects of interest in image data. In this embodiment, during forward propagation a set of filters 204 are applied across image data 202 to generate outputs 206 based on any applicable offsets (i.e., strides). During backpropagation, an error factor is backpropagated through the network, enabling convolutional neural network data (e.g., filter data) to be adjusted to minimize subsequent errors.

The image data 202, the filter data 204, and the output data 206 can comprise any number of dimensions. For example, an image can comprise sets of two-dimensional (2D) data corresponding to different colors (e.g., data corresponding to red/green/blue (RGB) values); thus the image data 202 can comprise sets of 2D image data for each of said colors, and the filter data 204 can comprise sets of 2D filter data corresponding to each of said colors. In other embodiments, the filter data 204 can comprise different filters to detect different aspects of the image data 202.

Output values of the output data 206 can be determined by performing 2D matrix operations via the ALUs. ALUs are dedicated hardware designed to perform arithmetic operations. In some embodiments, ALUs are designed to specifically receive scalar and/or matrix operands and perform matrix operations. Representing (at least portions of) the image data 202 and the filter data 204 as matrix operands and characterizing convolution operations as matrix operations for these embodiments can increase the memory allocation and processing efficiencies of a system.

Figure 3:
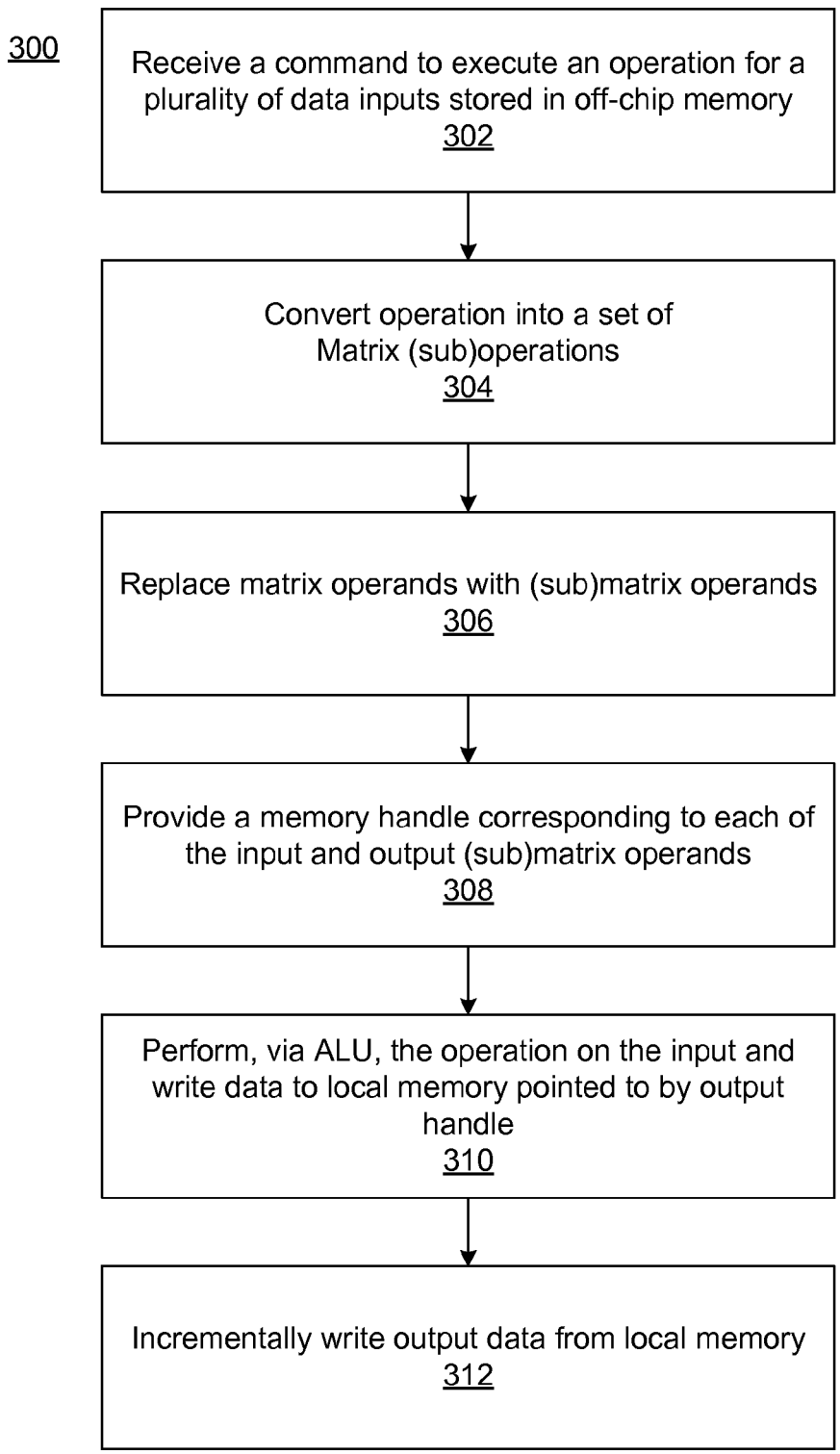
FIG. 3 is a flow diagram of a process for increasing memory access efficiency in processing clusters in accordance with some embodiments.

FIG. 3 is a flow diagram of a process for increasing memory access efficiency in processing clusters in accordance with some embodiments. Process and logical flow diagrams as illustrated herein provide examples of sequences of various process actions. Although shown in a particular sequence or order, unless otherwise specified, the order of the actions may be modified. Thus, the described and illustrated implementations should be understood only as examples, and the illustrated processes may be performed in a different order, some actions may be performed in parallel, and some actions may be pipelined. Additionally, one or more actions may be omitted in various embodiments; thus, not all actions are executed in every implementation. Other process flows are possible.

The operations of process 300 are described as being executed by the illustrated elements of FIG. 1A and FIG. 1B for exemplary purposes only. The controller circuitry 112 of the peripheral apparatus 110 can receive a command to execute an operation for a plurality of data inputs stored in the off-chip memory 118 (shown as block 302). As discussed above, the host system can execute an application that can be characterized as a series of arithmetic operations.

In some embodiments, ALUs of processing units, such as the ALUs of 131-13n of the processing cluster 190 of FIG. 1B, can be designed to efficiently execute matrix operations by receiving data operands organized as scalar, vector, or matrix operands (the term "matrix operand" is subsequently used herein to describe scalar, vector, or multi-dimensional matrix operands). In this embodiment, software executed via the host system and/or the controller circuitry 112 of the peripheral apparatus 110 can convert the operation for the plurality of data inputs stored in the off-chip memory 118 into a set of smaller matrix (sub) operations (shown as block 304). These matrix operations are to be executed via the plurality of processing units 116 of the peripheral apparatus 110 (and, in some embodiments, one or more additional peripheral apparatuses communicatively coupled to the peripheral apparatus 110 via the SerDes Interface 122). Software executed via the host system and/or the controller circuitry 112 of the peripheral apparatus 110 can determine what operations to distribute to the different processing units 116 based on the expected workload/availability of a processing unit cluster, the number of processing clusters of each processing unit, the number of ALUs per cluster, the amount of memory included in each cluster, etc. The processing control circuitry of the processing clusters 191-19n can operate on a portion of the data (i.e., can execute sub-operations), so multiple clusters can execute operations in concert, multiple processing units can execute operations in concert, and multiple peripheral apparatuses can execute operations in concert, etc. These portions of the data can comprise non-contiguous and overlapping portions. The processing clusters 191-19n can receive portions of image data, filter data, index data identifying subsets of image data and/or filter data, partial products, etc.

At the processing cluster level, to execute one or more of the matrix operations, the processing control circuitry 140 can create at least one matrix operands from data stored in any combination of the memory 104, the local memory 114, and the off-chip memory 118 (shown as block 306); the data is loaded into the processing cluster specific memory 150 and or the scratch memory 145. The operands are generated to ensure optimum utilization of data loaded onto the cluster specific memory 150 during the execution of operations (described in further detail below) in order increase processing speed and performance, thereby allowing for the size of cluster specific memory 150 used by the ALUs 131-13n to be reduced compared to prior art solutions.

Single memory handles corresponding to each of the at least one matrix operands are provided to one of the ALUs 131-13n to access the at least one matrix operand when executing one of the matrix operations (shown as block 308). As referred to herein, a memory handle describes an identifier for matrix input/output operands processed by the ALUs 131-13n; a memory handle used within the processing cluster 190 encapsulates the location of the respective data (i.e., in the processing cluster memory 150); in some embodiments, the memory handle further identifies the dimensions of the matrix operand and other information such as the matrix precision.

The ALUs 131-13n perform the operation of the operands and write data to local memory (i.e., the processing cluster specific memory 150 and or the scratch memory 145) pointed to by an output memory handle (shown as block 310). The generated output of the ALUs of the processing cluster can be stored in memory (shown as block 312). The output can be stored in the cluster specific memory 150 of the processing cluster 191, or incrementally written out of the cluster into any (available) combination of the on-chip memory 114 and the off-chip memory 118, or the memory 104 of the host system. In some embodiments, the output of an ALU can be used by another ALU for subsequent operations (described in further detail with respect to FIG. 5).

Thus, some embodiments describe an improvement in a processing speed and performance by executing an incremental and pipelined fetch of operands, a pipelined scheduling of operations along with the accumulation, and a pipelines write of the results back to memory. As discussed above, operations related to deep learning applications can comprise convolution operations, linear contrast operations, local response normalization operations, max pooling operations, etc. Convolution operations can be executed for various applications such as object recognition, image enhancement, edge detection, etc. FIG. 4A-FIG. 4E illustrate a series memory loads for cluster specific memory of a processing cluster executing a convolution (sub)-operation in accordance with some embodiments.

Figure 4A:
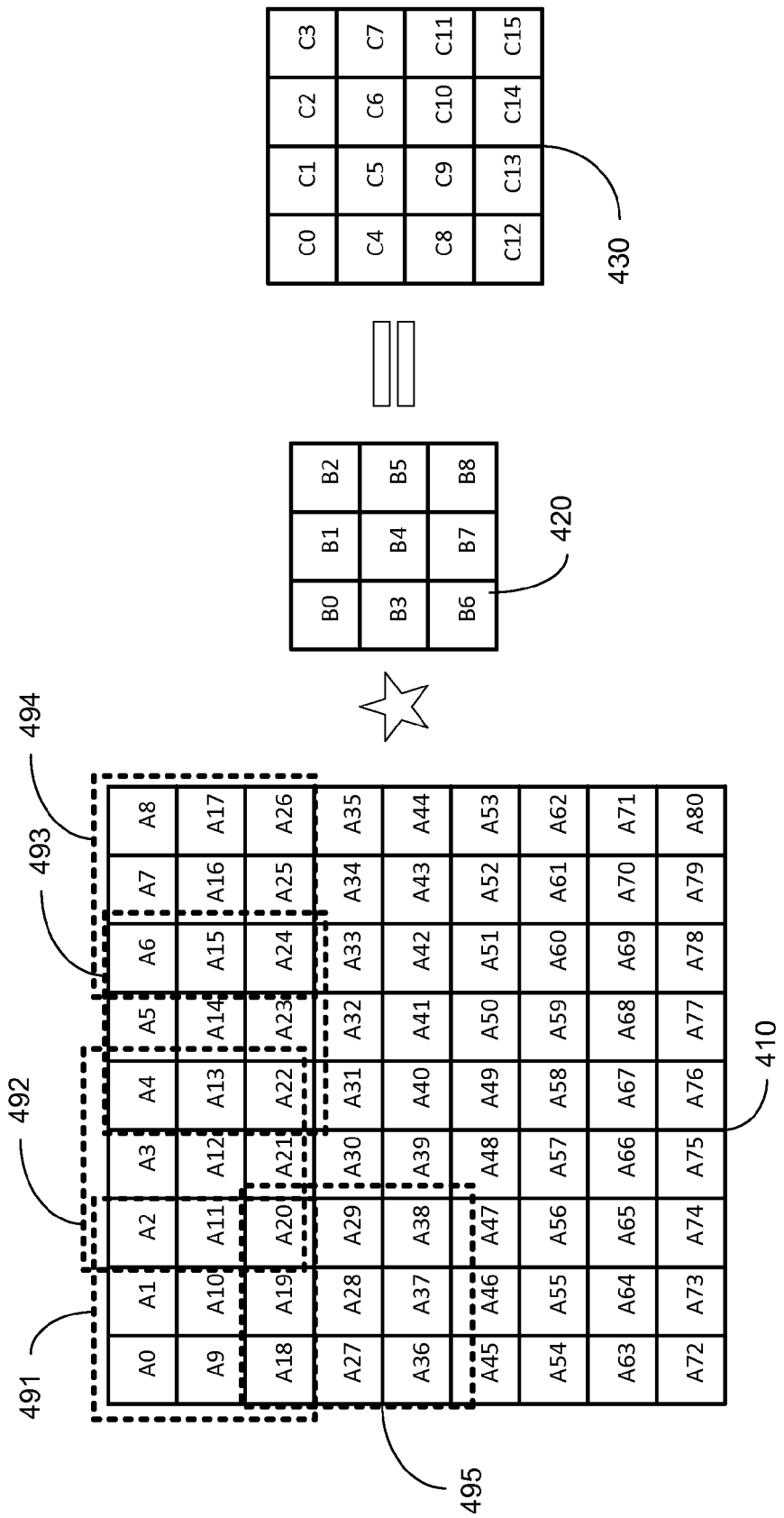
FIG. 4A-FIG. 4F illustrate a series memory loads for cluster specific memory of a processing cluster executing a convolution (sub)-operation in accordance with some embodiments.

FIG. 4A illustrates image data in the form of a 9×9 matrix 410 including matrix elements A0-A80 and filter data in the form of a 3×3 matrix 420 including matrix elements B0-B8. The sizes of the image data 410 and the filter data 420 are selected for exemplary purposes only. Furthermore, the image data 410 and the filter data 420 can be portions of a larger set of data distributed across multiple processing clusters, processing units, peripheral apparatuses, etc.; for example, the image data 410 can comprise a portion of red pixel image data of an RGB image, and the filter data 420 can comprise a portion of a filter for red pixel image data. As discussed above, these portions of data can comprise non-contiguous and overlapping portions.

In this embodiment, the filter data 420 is to be applied to the image data 410 based on a stride value of '2.' In other words, a stride 491 is a 3×3 sub-matrix of the image data matrix 410 with a center element of A10, a second stride 492 is a 3×3 sub-matrix of the image data matrix 410 with a center element of A12 (i.e., two elements across from A10), a third stride 493 is a 3×3 sub-matrix of the image data matrix 410 with a center element of A14 (i.e., two elements across from A12), a fourth stride 494 is a 3×3 sub-matrix of the image data matrix 410 with a center element of A16 (i.e., two elements across from A16), a fifth stride 495 is a 3×3 sub-matrix of the image data matrix 410 with a center element of A28 (i.e., two elements down from A10), and so forth. In this example, sixteen strided sub-matrices are formed from the image data matrix 410 based on a stride value of '2.' Strided sub-matrices can be utilized in embodiments operating on large image data files in order to reduce redundant applications of filters (e.g., the stride value can comprise a number less than the width of applied filter to ensure all image data is applied to the filter data at least once).

A convolution operation using the filter data 420 and the image data 410 comprises an element-wise dot product of the filter data matrix and the strided sub-matrices of the image data, and is stored as a result matrix 430 comprising a 4×4 matrix including matrix elements C0-C15. In this embodiment, the element C0 of the result matrix 430 comprises the element wise dot product of the strided sub-matrix 491 and the filter data matrix 420 (i.e., a value of a central pixel is calculated and adding to the weighted values of all its neighbors together via element wise dot product operations):

$$C0=A0*B0+A1*B1+A2*B2+A9*B3+A10*B4+A11*B5+A18*B6+A19*B7+A20*B8$$

The element C1 of the result matrix 430 comprises the element wise dot product of the strided sub-matrix 492 and the filter data matrix 420, the element C2 of the result matrix 430 comprises the element wise dot product of the strided sub-matrix 493 and the filter data matrix 420, and so forth.

Figure 4B:
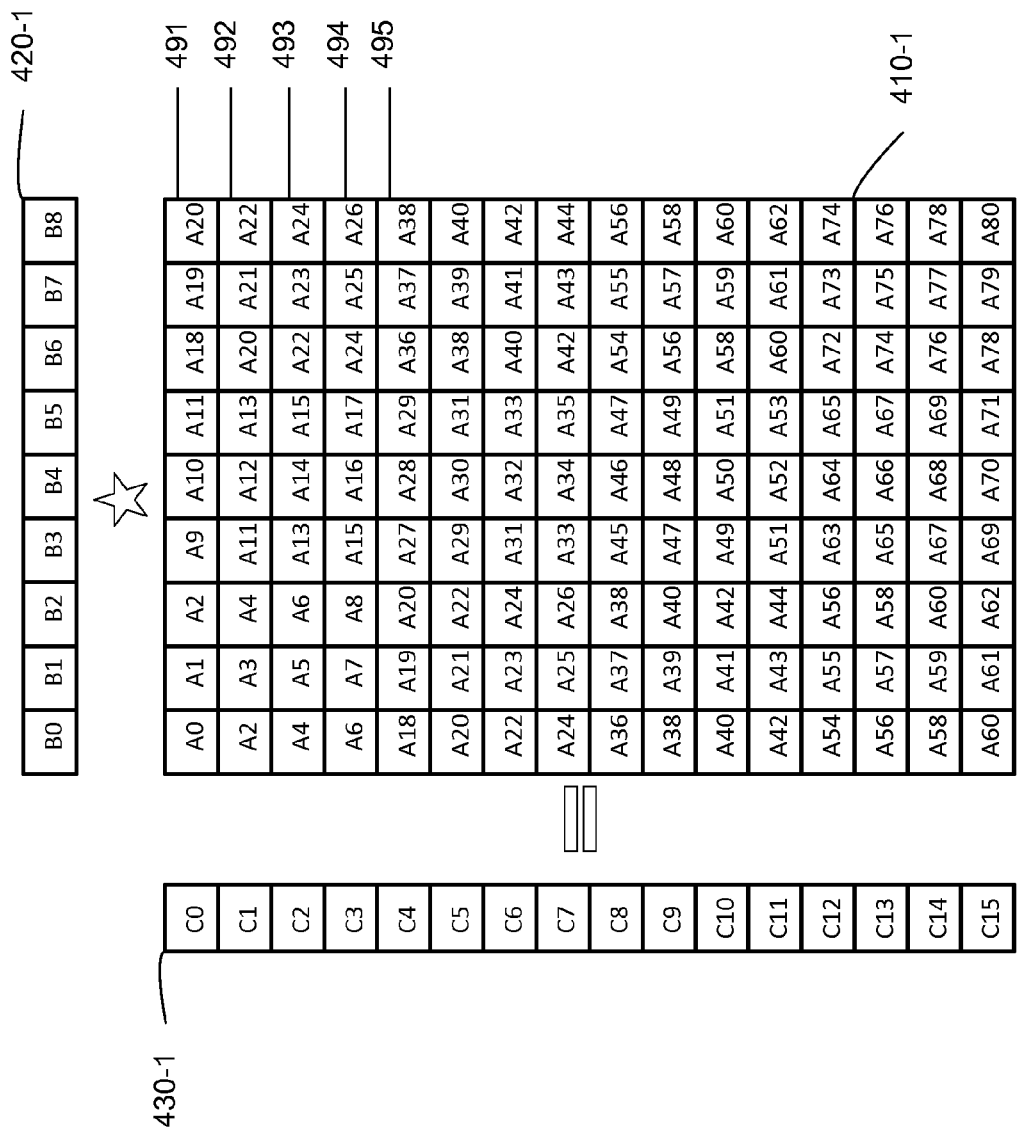

FIG. 4B is an illustration of the above described matrix data in vector/slice form. The filter data matrix 420 is shown as 1×9 vector/slice 420-1 and the result data matrix 430 is shown as a 16×1 vector/slice 430-1. The image data matrix 410 (which illustrates how the image data is stored in external memory) is shown to be organized as vectors/slices 410-1, wherein the strided sub-matrix 491 is the first row, the strided sub-matrix 492 is the second row, the strided sub-matrix 493 is the third row, and so forth. Processing control circuitry of a processing cluster accesses the image data 410 stored in external memory and creates operands according to the vectors/slices 410-1 (but not necessarily in the order starting from the top row, as described in further detail below). Representing the data in this form (i.e., fetching non-contiguous data from the external memory and storing them contiguously in local memory) allows for ALUs (which, in some embodiments, are configured to receive vector data comprising the same number of elements) to efficiently perform the element wise dot products that are associated with the convolution operations.

In this exemplary embodiment, the strided sub-matrices of the image data matrix 410 are discussed as being utilized by a processing cluster to generate the result elements C0-C15. In other embodiments, different processing clusters may be assigned to generate different result elements, and thus, different processing clusters may retrieve the associated strided sub-matrices. Each cluster could receive information such as the size of the entire image data, its memory location (e.g., starting memory address), and the result element it is generating in order to load the corresponding the strided sub-matrices.

Figure 4C:
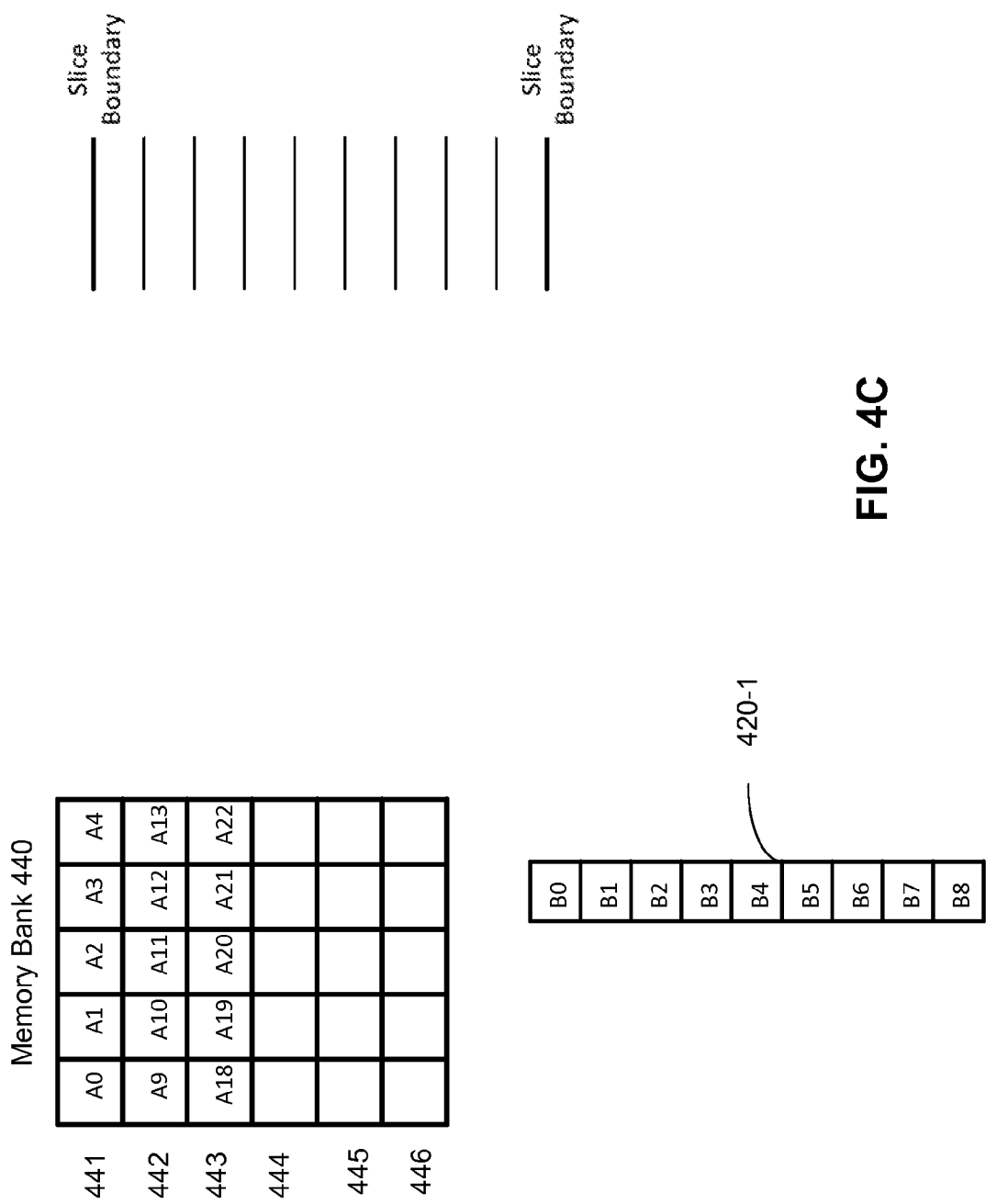

FIG. 4C is an illustration of a portion of the image data 410 and the filter data 420 loaded from external memory to processing cluster memory in accordance with some embodiments. Processing cluster specific memory can include portions of memory (e.g., memory banks) allocated for loading portions of the image data 410 (including the memory bank 440), a portion allocated to include the filter data 420 in accordance with the filter data vector/slice 420-1, and portions allocated to include the image data in accordance with the format of the image data vectors/slices 410-1. In this example, the memory bank 440 of the processing cluster specific memory is shown in a state wherein the image data elements A0-A4 from the matrix 410 are loaded in the first memory bank row 441, the image data elements A9-A13 are loaded in the second memory bank row 442, and the image data elements A18-A22 are loaded in the third memory bank row 443; in other embodiments, other sets of image data elements can be selected. These image data elements are loaded in accordance with the format that the image data 410 is stored in the external memory (truncated to fit within the rows of the memory bank 440). Each of the memory bank rows can be loaded during a system clock cycle.

At this stage of memory loading, the image data elements for the strided sub-matrix 491 are present, and thus the strided sub-matrix 491 can be loaded (in vector/slice form) into the processing cluster specific memory allocated for the strided vector/slice image data 410-1.

Figure 4D:
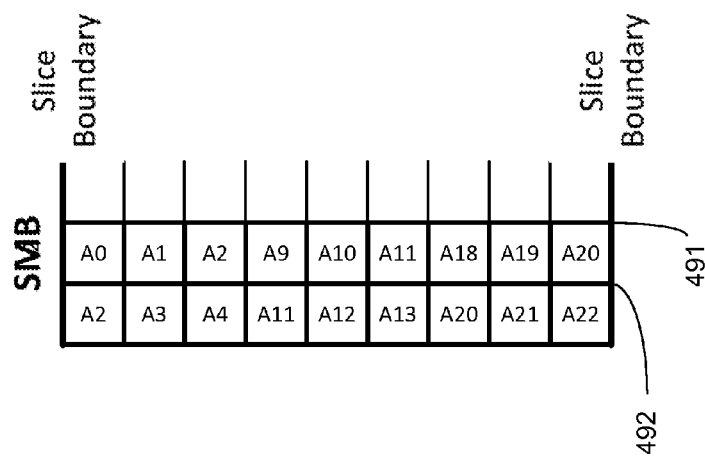
Figure 4D:
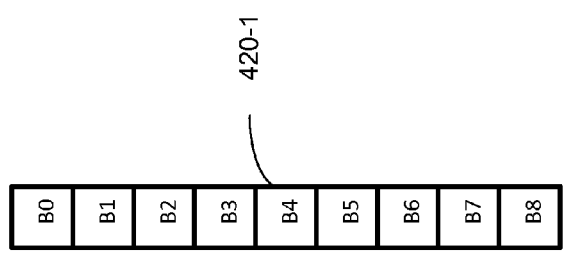

FIG. 4D illustrates the memory bank 440 of the processing cluster specific memory further including the image data elements A27-A31, A36-A40, and A45-A49 in the memory row banks 444, 445, and 446, respectively. The image data elements for the strided sub-matrix 491 and the strided sub-matrix 492 are loaded into the processing cluster specific memory allocated for the strided vector/slice image data 410-1 (in this example, each stride is loaded five elements at a time per clock cycle consistent with the sizes of memory bank rows 441-446). At this stage of the memory loading process, to load additional image data, memory bank rows are to be overwritten (the quantity rows of the device memory bank is limited to six rows for exemplary purposes only). As the strided sub-matrices 491 and 492, which include the image data elements A0-A4 and A9-A13, have been loaded in the processing cluster memory allocated for the strided vector/slice image data, the data in the memory bank rows 441 and 442 are overwritten as shown FIG. 4E, replaced by additional data elements of the image data 410.

Figure 4E:
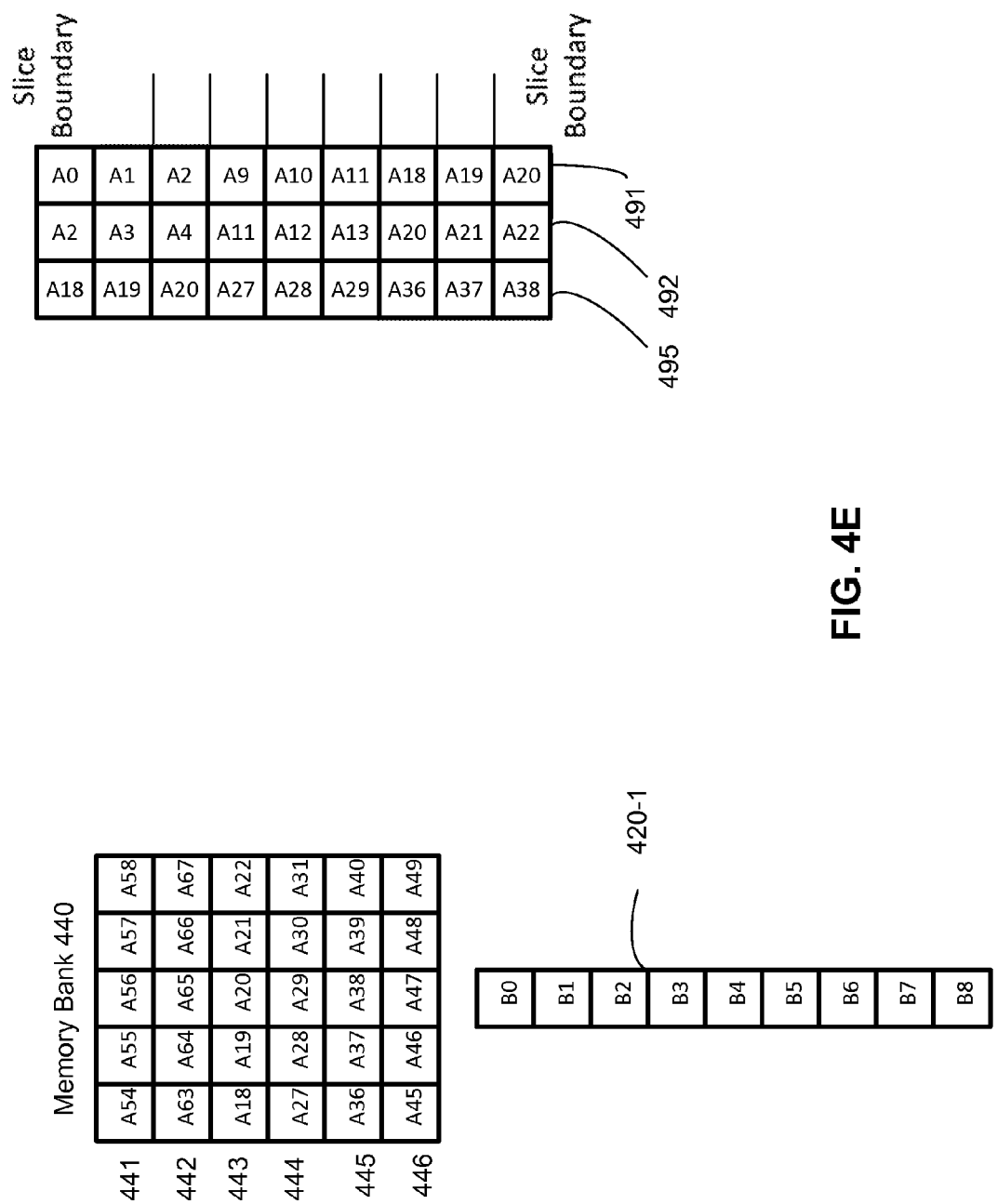
Figure 4F:
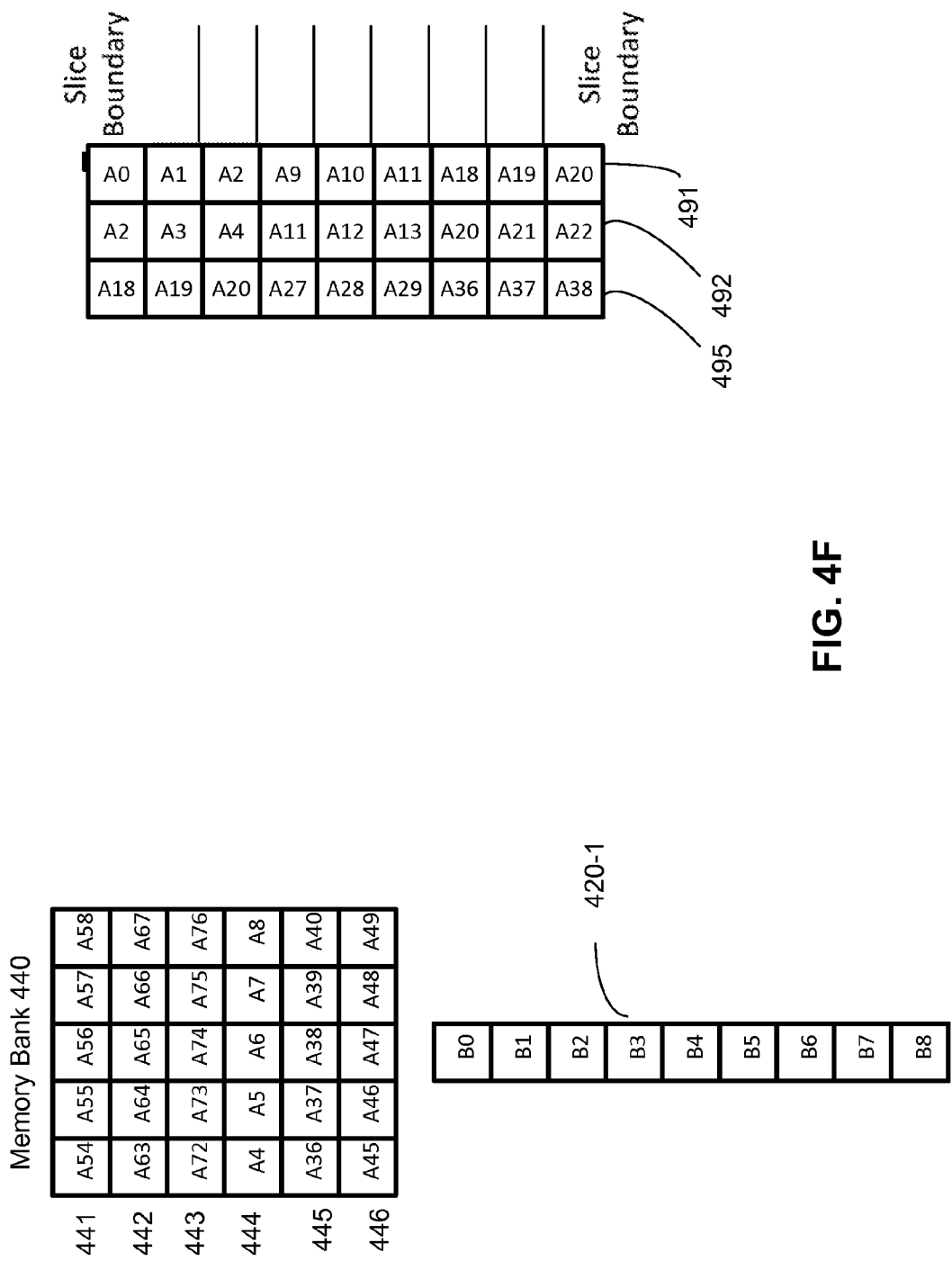

FIG. 4E further illustrates that the strided sub-matrix 495 is loaded into the processing cluster memory allocated for the strided vector/slice image data 410-1. The processing cluster control circuitry identifies that the respective elements for the strided sub-matrix 495 are present in the memory bank 440, and loads the data accordingly. Thus, the strides as shown in the strided vector/slice image data 410-1 are each eventually loaded into the processing cluster memory allocated for strided vector/slice image data, but are not necessarily loaded in order. Furthermore, the rows 441-446 of the memory bank 440 are not necessarily overwritten in order. In this exemplary embodiment, some of the data elements are loaded more than once (for example, creating the strided sub-matrix 493 involves another load of the data element A4, as shown in the matrix row bank 444 of FIG. 4F); however, generating each of the result data matrix elements C0-C15 based on the data available in the processing cluster specific memory ensures that the ALUs are processing data as much as possible and the re-use of the data that is loaded into the processing cluster specific memory is maximized, thereby allowing the amount of processing cluster specific memory to be minimized.

Figure 5:
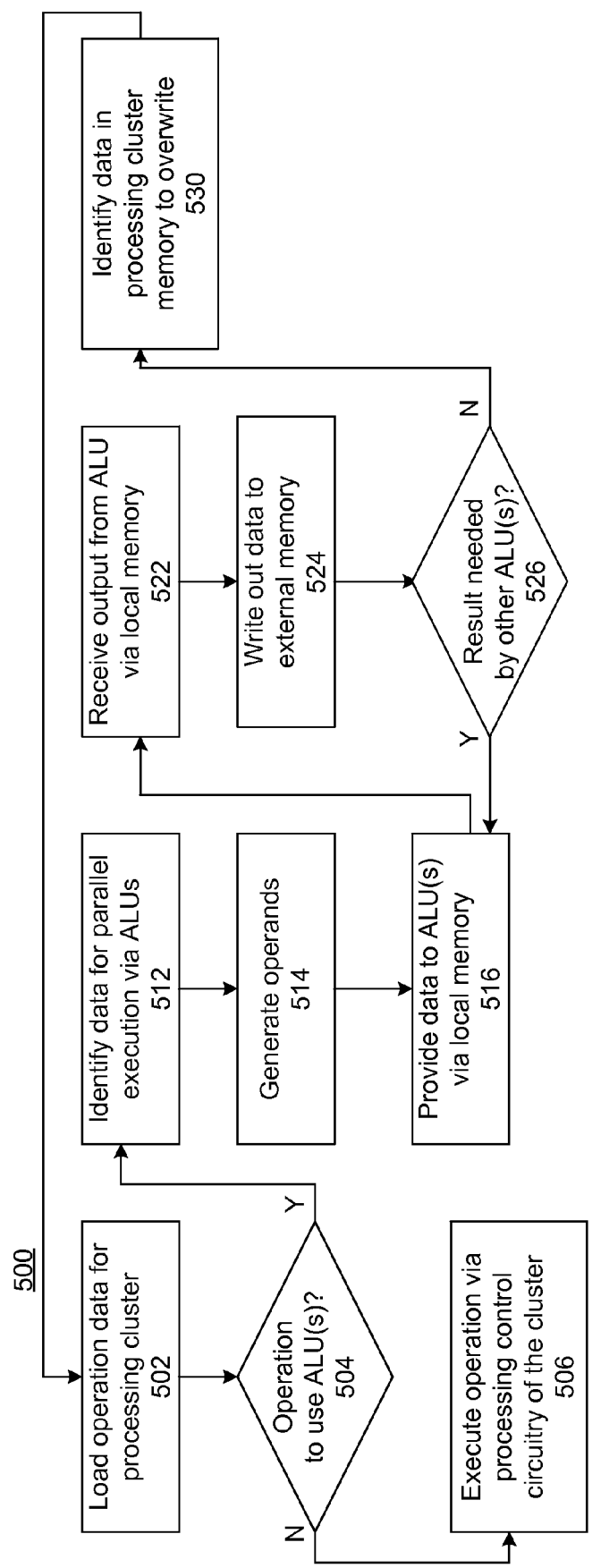
FIG. 5 is an illustration of a process for controlling the execution of operations within a processing cluster in accordance with some embodiments.

FIG. 5 is an illustration of a process for controlling the execution of operations within a processing cluster in accordance with some embodiments. Process 500 includes an operation, as discussed above, for processing control circuitry of a processing cluster to load data for one or more operations the processing cluster is to execute (shown as block 502). In some embodiments, in order to maximize the use ALUs of the processing cluster, the processing control circuitry can identify operations that do not require the use of an ALU; some operations, such as matrix operations, utilize ALUs, while others, such as backward propagation max pooling (i.e., splitting up a matrix of filter outputs into small non-overlapping grids, and simply selecting the maximum value in each grid as the value in the reduced matrix) can be accomplished without the use of the ALU. A determination is made as to whether one or more ALUs of the processing cluster are to be used to execute the received operation (shown as block 504). The processing control circuitry may execute the operation (shown as block 506), or the processing control circuitry can begin to perform operations to generate operands in the local memory of the cluster.

For operations utilizing ALUs of the processing cluster, data loaded into the processing cluster specific memory is identified that would enable parallel execution by the ALUs (shown as block 512). In other words, data is identified that would allow two or more ALUs to execute in parallel to reduce occurrences of an ALU idling with awaiting the result from another ALU. The operands based on this data are generated (shown as block 514) and provided to the ALUs (shown as block 516) in the appropriate format via the respective processing cluster memory.

The outputs for the ALUs are loaded into the local memory of the processing cluster by the processing cluster control circuitry (shown as block 522). The output data is subsequently streamed out to memory external to the processing cluster (shown as block 524). It is determined if any of the outputs are intermediate results to be used by one or more ALUs to execute a subsequent operation (shown as block 526). Intermediate results are provided to ALUs (shown as block 516); in some embodiments, partial results are added directly to an output slice rather instead of being stored in memory. Memory space is identified that may be subsequently overwritten in the processing cluster control circuitry (shown as block 530) so that additional data for the received operations can be loaded into the local memory of the processing cluster.

As discussed above, in addition to forward propagation convolution operations, deep learning applications can execute backward propagation operations (alternatively referred to herein as "backpropagation"). While forward propagation convolution operations condense multiple pixel values into a single output value, backpropagation operations expand a single value into multiple output pixel values. Backpropagation operations can be used to determine an error factor based on a difference between an expected output for an image data and an output generated through forward propagation of the image data and one or more filters. This error factor is backpropagated through the network, enabling the filter data and/or weights of the convolutional network to be adjusted to minimize subsequent errors.

The embodiments for efficient memory access processes for processing clusters are described above with respect to forward propagation operations. Some embodiments utilize the same processes for backpropagation operations; back propagation can be expressed as tensor operations involving tensors that have a regular pattern of zeros inside of them. Controller circuitry can then express the tensor operation as a smaller tensor operation involving reduced tensors which do not have the said pattern of zeros. Thus, the data operand for a backpropagation operation cast as a forward propagation operations can potentially be created with a large amount of zero-value data.

Figure 6:
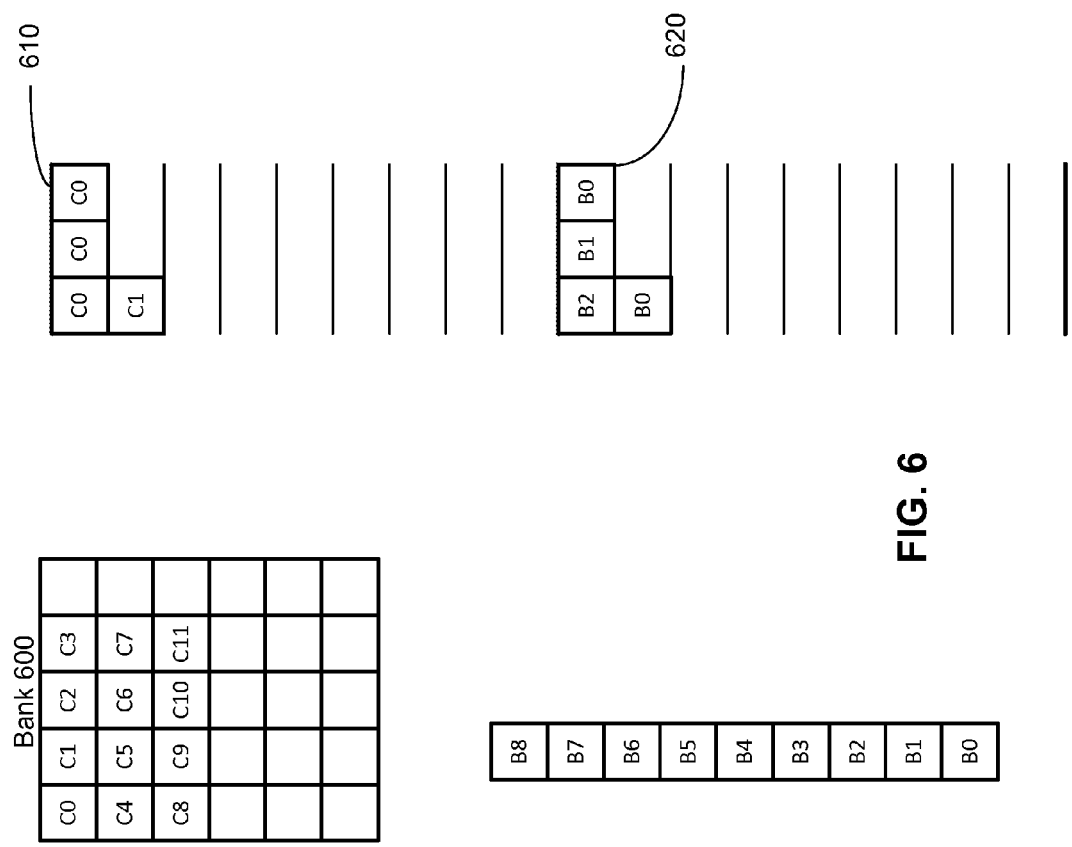
FIG. 6 illustrates result data elements and filter data elements used for a backward propagation operations in accordance with some embodiments.

FIG. 6 illustrates result data elements and filter data elements used for a backward propagation operations. In this example, result data elements C0-C11 are loaded into the cluster specific memory bank 600 allocated to load data from external memory, and filter data elements B0-B8 and also loaded from the external memory. In this example, the non-zero values for the result data elements C0-C11 are C0 and C1. The processing control circuitry of the processing cluster creates the operands 610 and 620 (stored in cluster specific memory allocated to store operand slices) to include only the non-zero data from the result data elements C0-C11, and the relevant filter data for the non-zero data. Thus, rather than creating operands comprising nine elements (i.e., corresponding to the number of filter data elements B0-B8), operands 610 and 620 are created to comprise four elements consisting of non-zero values. The ALUs of the processing cluster can efficiently execute matrix operations that are implicitly known to have operands with regular sub-patterns of zeros by posing them as matrix operations with smaller operands that do not comprise the said sub-patterns of zeros.

Figure 7:
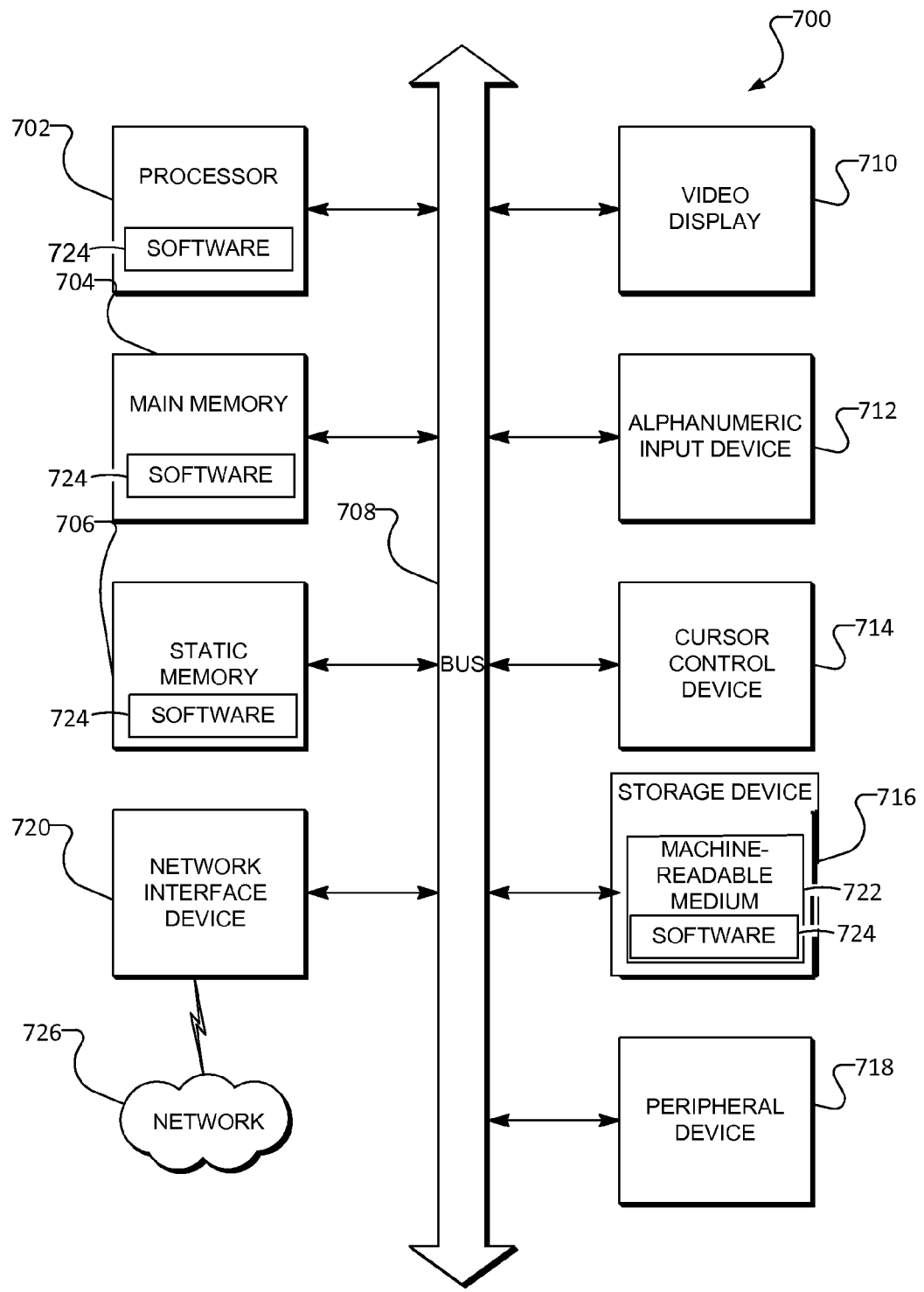
FIG. 7 is a block diagram illustrating components of a computer system in accordance with some embodiments.

FIG. 7 is a block diagram illustrating components of a computer system in accordance with some embodiments. In particular, FIG. 7 illustrates an exemplary computer system 700 within which software 724 can cause the machine including the illustrated components of the system 700 to perform any one or more processes that can utilize linear algebra routines, operations, and operands discussed herein. In alternative embodiments, the machine operates as a standalone device or can be communicatively coupled to other machines (e.g., via a network connection). In a networked deployment, the machine can operate in the capacity of a server or a client machine in a server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 700 includes at least one processor/processor core 702 (e.g., a CPU, CPU or both), a main memory 704 and a static memory 706, which communicate with each other via a bus 708. The computer system 700 can further include a video display unit 710 (e.g., a LCD or a cathode ray tube (CRT)). The computer system 700 also includes an alphanumeric input device 712 (e.g., a keyboard), a user interface navigation (or cursor control) device 714 (e.g., a mouse), a storage device 716, a peripheral device 718 (e.g., the peripheral apparatus 110 of FIG. 1A), and a network interface device 720.

The storage device 716 includes a non-transitory machine-readable medium 722 on which is stored one or more sets of data structures and software 724 embodying or utilized by any one or more of the methodologies or functions described herein. The software 724 can also reside, completely or at least partially, within the main memory 704 and/or within the processor 702 during execution thereof by the computer system 700, with the main memory 704 and the processor 702 also constituting non-transitory, machine-readable media 722. The software 724 can also reside, completely or at least partially, within the static memory 706.

While the non-transitory machine-readable medium 722 is shown in an example embodiment to be a single medium, the term "machine-readable medium" can include a single medium or multiple media (e.g., a centralized or distributed database, and/or associated caches and servers) that store the one or more software 724 or data structures. The term "machine-readable medium" shall also be taken to include any tangible medium that is capable of storing, encoding, or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media 722 include non-volatile memory, including by way of example semiconductor memory devices (e.g., erasable programmable read-only Memory (EPROM), electrically erasable programmable read-only memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Figure 8A:
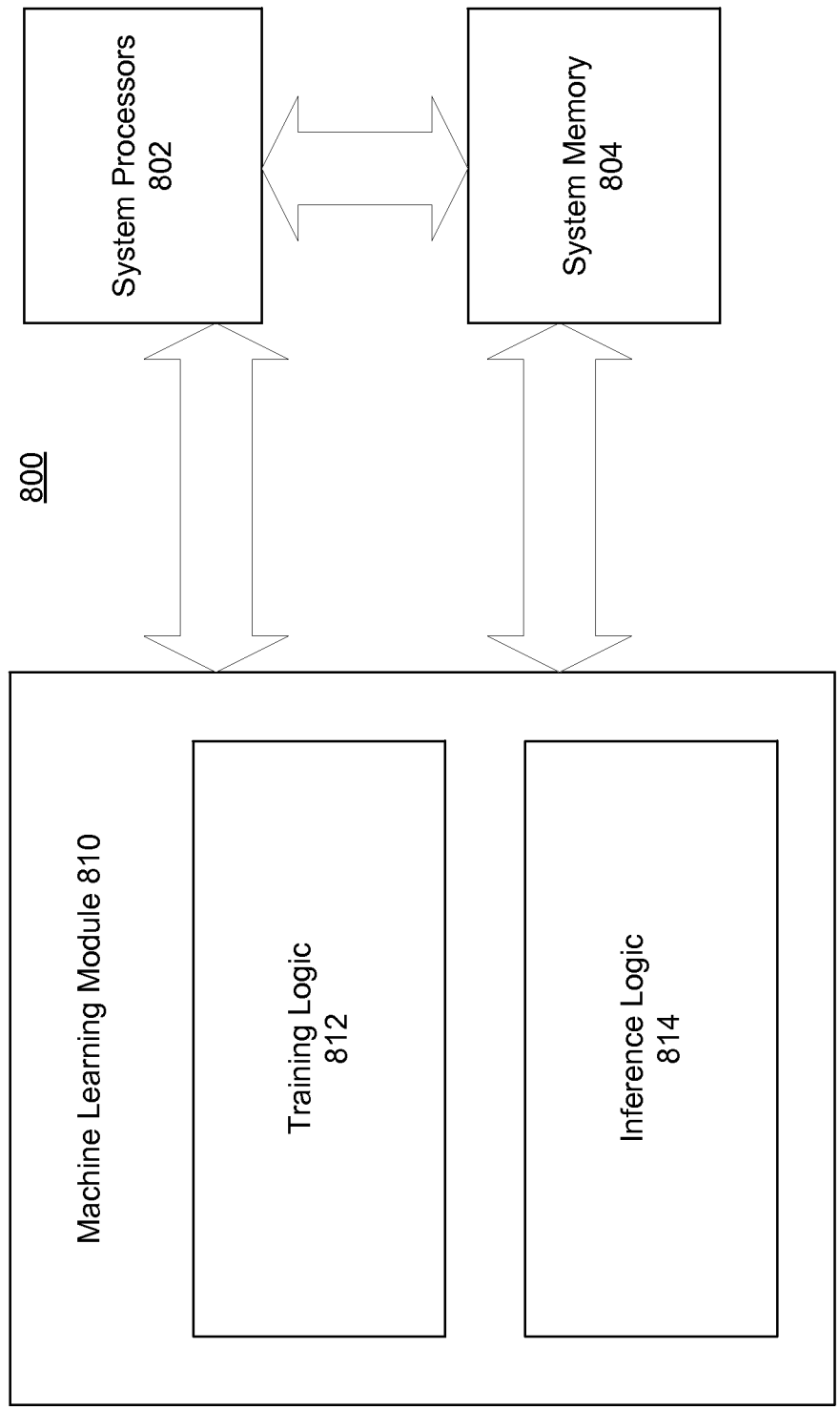
FIG. 8A-FIG. 8B are illustrations of system components for executing a machine learning module in accordance with some embodiments.
Figure 8B:
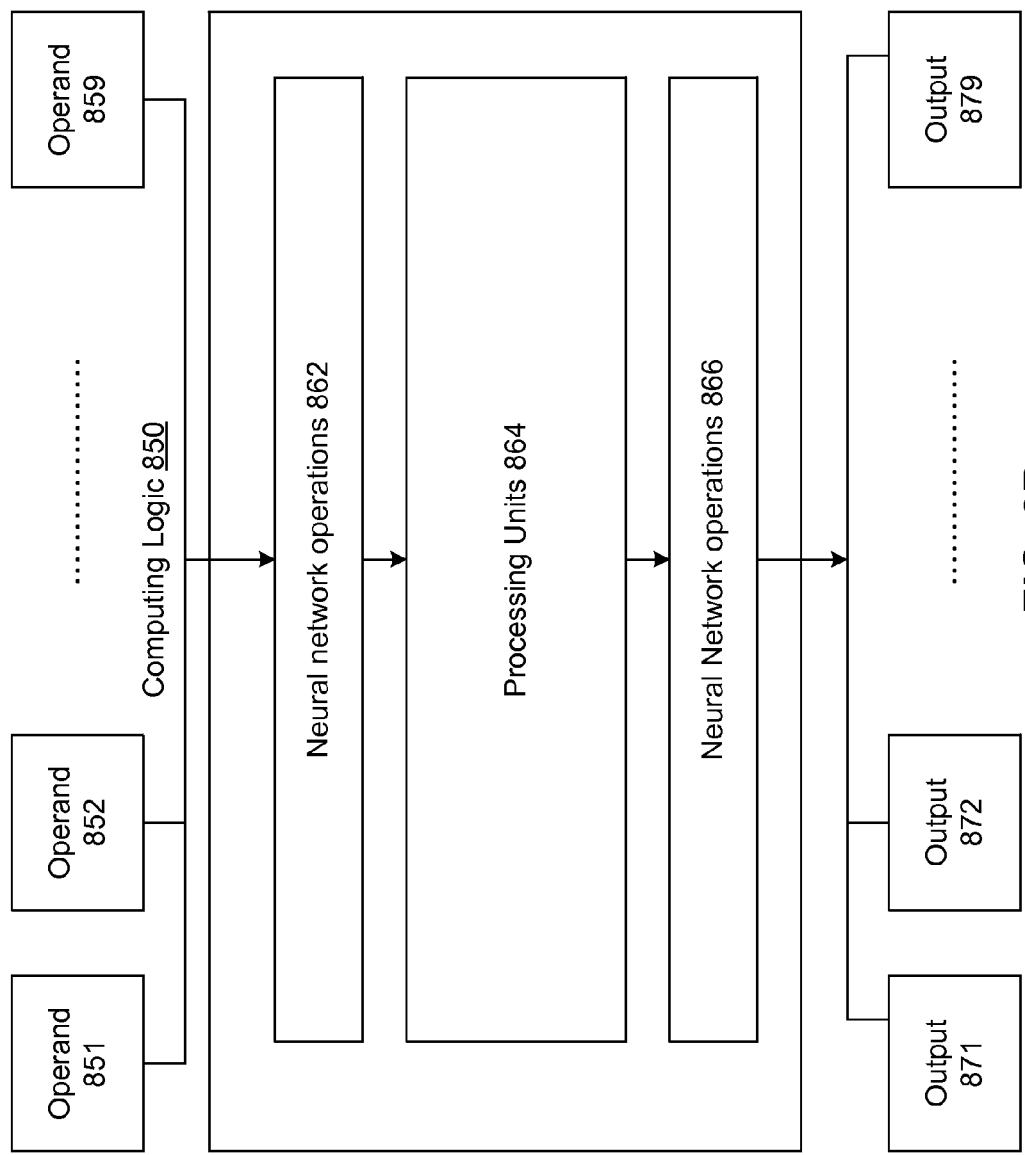

FIG. 8A-FIG. 8B are illustrations of system components for executing a machine learning module in accordance with some embodiments. In this embodiment, system 800 as shown in FIG. 8A includes a machine learning module 810 executed via one or more system processors 802 and a system memory 804. The machine learning module 810 can comprise any module to execute a machine learning process and can be included in a machine learning model (e.g., a neural network). The machine learning module 810 is shown to include a training module 812 and an inference module 814 (as referred to herein, any software "module" can be implemented as hardware logic or circuitry). The training module 812 is executed for computations wherein parameters of a machine learning algorithm are adjusted using training data. The inference module 814 is executed for computing runtime information as a function of input data and data from the training module 812. These operations of the training module 812 and the inference module 814 can comprise any of a matrix-matrix element-wise operation (e.g., common operations such as +, *, /, <, >, ==, etc.), a matrix-matrix multiply operation—including a matrix-matrix multiply operation with a (processor stored) partial product as described above, compound operations, convolution operations such as one or more matrix-matrix multiply operations further applied to one or more element-wise operations, a random sampling operation, etc.

FIG. 8B illustrates one of the system processors 802 according to an embodiment. Neural networks (in addition to other machine learning systems) often execute complex mathematic operations that include linear algebra operations combined with other operations. In neural networks, linear algebra operations can be preceded or followed by other operations including non-linearities, random sampling operations, pooling operations, subsampling operations, and normalization operations depending on the particular neural network algorithm. Each class of operations comprises a number of possibilities. Non-linearities can include sigmoid units, rectified linear units, 'max-out' units, etc. Random sampling operations can include sampling from a family of probability distributions and can comprise Bernoulli (or binary) and Gaussian distributions, etc. Pooling operations can include operations on tiled subsets of the output of the linear algebra operations and can comprise max pooling and average pooling. Subsampling operations can take a strided subset of the output of the linear algebra operations. Normalization operations can include taking the output of linear algebra operations or series of operations and performing a normalization operation across all these outputs. These operations can include divisive or subtractive normalization, cross-map normalization, softmax operations, etc.

A computing logic 850 is shown to include logic 862 and 866 for executing neural network operations and processing units 864 for executing matrix multiply operations (and other operations such as convolution operations), such that the processing units 864 can execute any combination of linear algebra operations and other operations (i.e. generate one or more outputs 871-879 based on the operands 851-859). The outputs 871-879 can be used as input 851-859 of subsequent layers. The computing logic 850 can execute a large number of these operations, and thus can utilize any of the embodiments directed towards matrix operands for linear algebra operations discussed above.

In the foregoing detailed description, the method and apparatus of the present subject matter have been described with reference to specific exemplary embodiments thereof. It will, however, be evident that various modifications and changes can be made thereto without departing from the broader spirit and scope of the present disclosed subject matter. The present specification and figures are accordingly to be regarded as illustrative rather than restrictive.

Some embodiments describe one or more integrated circuits (ICs) comprising controller circuitry to receive a command to execute an operation for a plurality of data inputs stored in an external memory or a local memory, and convert the operation into a set of matrix operations to operate on sub-portions of the plurality of data inputs. The one or more ICs further comprise at least one processing circuitry to execute the set of matrix operations, the processing circuitry to include arithmetic logic units (ALUs), a local memory external to the ALUs and accessible by the ALUs, and processing control circuitry to create at least one matrix operand in the local memory from the plurality of data inputs of the operation, the at least one matrix operand comprising at least one of a scalar, a vector, or a two-dimensional (2D) matrix, and provide memory handles corresponding to each of the matrix operands to one of the ALUs to access the respective matrix operands when executing one of the matrix operations.

In some embodiments, the processing control circuitry of the processing circuitry is to further store the output of one of the ALUs in the local memory of the processing circuitry. In some embodiments, the processing control circuitry comprises a plurality of pipeline stages configured to execute operations to create matrix operands, provide memory handles, and store the output of the ALUs substantially in parallel.

In some embodiments, the processing control circuitry is to further create matrix operands by loading data from the data inputs stored in the external memory into memory rows of the local memory, and overwrite a memory row in response to completion of a matrix operation.

In some embodiments, the processing control circuitry is to further identify matrix operations corresponding to an operation that can be executed in parallel by the ALUs of the processing circuitry, and fetch non-contiguous data from the plurality of data inputs of the operation stored in the external memory to be stored contiguously in the local memory for the processing control circuitry to create matrix operands for parallel execution of matrix operations. In some embodiments, the processing control circuitry is to further ensure the local memory of the processing circuitry includes only data accessed by the processing control circuitry or the ALUs during parallel execution of matrix operations.

In some embodiments, the operation comprises a convolution operation, the plurality of inputs comprises image data, one or more filters, or index data, and the at least one matrix operand comprises a first matrix operand comprising data from the image data and a second matrix operand comprising data from the one or more filters or the index data. In some embodiments, the convolution operation comprises a strided convolution operation, and the processing control circuitry is to further create a first matrix operand from the image data according to a stride value of the strided convolution operation.

In some embodiments, the operation comprises at least one of a linear contrast operation, a local response normalization operation, or a max pooling operation. In some embodiments, the processing control circuitry is to provide an output of the ALUs to another processing circuitry.

In some embodiments, the processing control circuitry is to write-out an output of the ALUs to a data output object stored in the external memory. In some embodiments, the operation comprises a backpropagation operation, the data inputs of the backpropagation operation include a set of generated output values and a set of expected output values, and the processing control circuitry is to write-out an output of the ALUs to a sequence of weight values stored in the external memory. In some embodiments, the processing control circuitry is to further execute matrix operations comprising operands with sub-patterns of zeros by executing them as matrix operations with smaller operands that do not contain the sub-patterns of zeros. In some embodiments, the processing control circuitry is to further identify an output of an ALU as a partial product of a matrix multiplication operation, and provide the partial product output to another ALU for adding to partial products generated by one or more other ALUs or store the partial product in the external memory for subsequent addition with other partial products.

In some embodiments, the controller circuitry is to further convert the operation into a set of matrix operations that operate on at least some non-contiguous or overlapping sub-portions of the plurality of data inputs. In some embodiments, the processing circuitry is to further bypass the ALUs and execute some of the operations.

Some embodiments describe a system comprising a host processor, a host memory, an input/output (I/O) interface, a memory separate from the host memory, and one or more ICs comprising the controller circuitry and the at least one processing circuitry described above.

In some embodiments, the host processor, the memory separate from the host memory, and the one or more ICs are included in a self-hosting device. In some embodiments, the host processor is to further execute a neural network machine learning module. In some embodiments, the one or more ICs are included in one of a plurality of peripheral apparatuses included in the system, and further comprise one or more inter-chip interfaces for coupling to one or more other peripheral apparatuses included in the system, wherein the peripheral apparatuses included in the system are interconnected in a multi-dimensional array.

The invention claimed is:

1. One or more integrated circuits (ICs) comprising:
   controller circuitry to:
      receive a command to execute an operation for a plurality of data inputs stored in an external memory or a local memory; and
      convert the operation into a set of matrix operations, wherein the set of matrix operations are to each operate on respective sub-portions of the plurality of data inputs; and
   at least one processing circuitry to execute the set of matrix operations, the processing circuitry to include:
      a plurality of arithmetic logic units (ALUs);
      a local memory external to the ALUs and accessible by the ALUs; and
      processing control circuitry to:

create a plurality of matrix operands in the local memory from the plurality of data inputs of the operation, wherein each of the plurality of matrix operands respectively comprises one of a scalar, a vector, or a two-dimensional (2D) matrix; and provide a plurality of memory handles to the plurality of ALUs, wherein each of the memory handles corresponds to a respective one of the matrix operands, and the plurality of ALUs are to access the respective matrix operands using the memory handles in association with executing the matrix operations.

2. The one or more ICs of claim 1, wherein the processing control circuitry of the processing circuitry is to further store the output of one of the ALUs in the local memory of the processing circuitry.

3. The one or more ICs of claim 2, wherein the processing control circuitry comprises a plurality of pipeline stages configured to execute operations to create matrix operands, provide memory handles, and store the output of the ALUs substantially in parallel.

4. The one or more ICs of claim 1, wherein the processing control circuitry is to further:
create matrix operands by loading data from the data inputs stored in the external memory into memory rows of the local memory; and
overwrite a memory row in response to completion of a matrix operation.

5. The one or more ICs of claim 1, wherein the processing control circuitry is to further:
identify matrix operations corresponding to an operation that can be executed in parallel by the ALUs of the processing circuitry; and
fetch non-contiguous data from the plurality of data inputs of the operation stored in the external memory to be stored contiguously in the local memory for the processing control circuitry to create matrix operands for parallel execution of matrix operations.

6. The one or more ICs of claim 5, wherein the processing control circuitry is to further: ensure the local memory of the processing circuitry includes only data accessed by the processing control circuitry or the ALUs during parallel execution of matrix operations.

7. The one or more ICs of claim 1, wherein the operation comprises a convolution operation, the plurality of inputs comprises image data, one or more filters, or index data, and the at least one matrix operand comprises a first matrix operand comprising data from the image data and a second matrix operand comprising data from the one or more filters or the index data.

8. The one or more ICs of claim 7, wherein the convolution operation comprises a strided convolution operation, and the processing control circuitry is to further:
create a first matrix operand from the image data according to a stride value of the strided convolution operation.

9. The one or more ICs of claim 1, wherein the operation comprises at least one of a linear contrast operation, a local response normalization operation, or a max pooling operation.

10. The one or more ICs of claim 1, wherein the processing control circuitry is to further:
provide an output of the ALUs to another processing circuitry.

11. The one or more ICs of claim 10, wherein the processing control circuitry is to further:

identify an output of an ALU as a partial product of a matrix multiplication operation; and
provide the partial product output to another ALU for adding to partial products generated by one or more other ALUs or store the partial product in the external memory for subsequent addition with other partial products.

12. The one or more ICs of claim 1, wherein the processing control circuitry is to further:
write-out an output of the ALUs to a data output object stored in the external memory.

13. The one or more ICs of claim 12, wherein the operation comprises a backpropagation operation, the data inputs of the backpropagation operation include a set of generated output values and a set of expected output values, and the processing control circuitry is to further:
write-out an output of the ALUs to a sequence of weight values stored in the external memory.

14. The one or more ICs of claim 13, wherein the processing control circuitry is to further: execute matrix operations comprising operands with sub-patterns of zeros by executing them as matrix operations with smaller operands that do not contain the sub-patterns of zeros.

15. The one or more ICs of claim 1, wherein the controller circuitry is to further:
convert the operation into a set of matrix operations that operate on at least some non-contiguous or overlapping sub-portions of the plurality of data inputs.

16. The one or more ICs of claim 1, wherein the processing circuitry is to further: bypass the ALUs and execute some of the operations.

17. A system comprising:
a host processor;
a host memory;
an input/output (I/O) interface;
a memory separate from the host memory; and
one or more integrated circuits (ICs) comprising:
controller circuitry to:
receive a command to execute an operation for a plurality of data inputs stored in an external memory or a local memory; and
convert the operation into a set of matrix operations, wherein the set of matrix operations are to each operate on respective sub-portions of the plurality of data inputs; and
at least one processing circuitry to execute the set of matrix operations, the processing circuitry to include:
a plurality of arithmetic logic units (ALUs);
a local memory external to the ALUs and accessible by the ALUs; and
processing control circuitry to:
create plurality of matrix operands in the local memory from the plurality of data inputs of the operation, wherein each of the plurality of matrix operands respectively comprises one of a scalar, a vector, or a two-dimensional (2D) matrix; and
provide a plurality of memory handles to the plurality of ALUs, wherein each of the memory handles corresponds to a respective one of the matrix operands, and the plurality of ALUs are to access the respective matrix operands using the memory handles in association with executing the matrix operations.

18. The system of claim 17, wherein the host processor, the memory separate from the host memory, and the one or more ICs are included in a self-hosting device.

19. The system of claim 17, wherein the host processor is to further execute a neural network machine learning module.

20. The system of claim 17, wherein the one or more ICs are included in one of a plurality of peripheral apparatuses included in the system, and further comprise:

one or more inter-chip interfaces for coupling to one or more other peripheral apparatuses included in the system;

wherein the peripheral apparatuses included in the system are interconnected in a multi-dimensional array.

* * * * *